United States Patent

[11] 3,548,927

[72] Inventor John E. Spurling
Encino, Calif.
[21] Appl. No. 780,157
[22] Filed Nov. 29, 1968
[45] Patented Dec. 22, 1970
[73] Assignee International Electronic Research Company
Burbank, Calif.
a corporation of California

[54] HEAT DISSIPATING RETAINER FOR ELECTRONIC COMPONENT
6 Claims, 6 Drawing Figs.

[52] U.S. Cl. .......... 165/80, 165/185, 174/35.5, 317/234
[51] Int. Cl. .......... H01l 1/12
[50] Field of Search .......... 317/234/1; 174/35.5; 165/80, 185

[56] References Cited

UNITED STATES PATENTS 2,863,974 12/1958 Zabel et al. .......... 317/100X
3,211,822 10/1965 Krall et al. .......... 174/35.5
3,212,569 10/1965 McAdam .......... 165/80

OTHER REFERENCES

AUGAT CRADLES, Augat Bros. Inc., 33 Perry Ave., Attleboro, Mass., 4/1958, pp Cover, 11 and 17.

*Primary Examiner*—Albert W. Davis, Jr.
*Attorney*—Beehler and Arant

ABSTRACT: An assembly consisting of a resilient clip attached to a heat dissipating member in a relatively central location surrounded by heat dissipating elements, the clip having one or more spring elements bearing downwardly toward a central component retaining area, the spring clip being shaped in such a fashion that an electronic component can be slid under it and there pressed by the spring clip in a direction toward the retaining area of the heat dissipating member and also the area at which the heat dissipating member is mounted upon an appropriate chassis or heat sink.

JOHN E. SPURLING
INVENTOR.

BY

Beehler & Arant
ATTORNEYS

JOHN E. SPURLING
INVENTOR.

BY
Beehler & Arant
ATTORNEYS

HEAT DISSIPATING RETAINER FOR ELECTRONIC COMPONENT

When small integrated circuit and microcircuit packages were first introduced they were usually not designed to be capable of dissipating significant amounts of power. Most of such packages were in fact designed so as to be limited to the low milliwatt range as for example 50 to 100 milliwatts. Since the dissipation of power was in such low degree heating problems were comparably at a relative minimum. Subsequently developed integrated circuit and microcircuit packages such as those currently being produced are capable of relatively larger amounts of power. By way of example one such device, namely, a voltage regulator in a ceramic package, ½ inch by 1 inch by 0.170 inches is rated at 5 watts of power dissipation. Circumstances are such however that unless there is some means of cooling the package the device intended to dissipate 5 watts of power can dissipate only about one-fifth of that amount, namely, 1 watt. If under the circumstances cited by way of example the 1 watt of dissipation is exceeded without providing a means for cooling the device, the semiconductors and other materials inside of the device would be destroyed. Therefore, to enable the device to operate at its rated power dissipation it is necessary to be able to dissipate the heat which is generated.

Another circumstance adding to the problem of maintaining such devices at their rated power is the practice of compacting a great many such devices in small spaces where there is a minimum amount of opportunity for air to circulate and thus cool by convection. Where cooling is to be augmented by drawing heat away from the device by conduction it is necessary to have surface to surface contacting of all those parts through which heat is to be passed from one to another. The contact moreover must be a firm close contact to provide a maximum degree of heat transfer. Where such devices are to be connected to a heat sink it is additionally necessary to have whatever heat dissipator is used with the electronic device properly mounted on and connected to the heat sink.

It is therefore among the objects of the invention to provide a new and improved clip assembly for conducting heat from an electronic component which provides a firm dependable and efficient connection between the component and a heat dissipating member upon which it is mounted.

Another object of the invention is to provide a new and improved clip assembly for conducting heat from an electronic component which is of such construction that the component can be readily mounted on the assembly and subsequently removed therefrom manually and without the use of tools.

Still another object of the invention is to provide a new and improved clip assembly for conducting heat from an electronic component wherein the assembly is of such design and construction that both the assembly and the component used with it can be readily and quickly assembled and disassembled and mounted upon an appropriate chassis or heat sink equally readily.

With these and other objects in view, the invention consists of the construction, arrangement, and combination of the various parts of the device, whereby the objects contemplated are attained, as hereinafter set forth, pointed out in the appended claims and illustrated in the accompanying drawings.

Figure 1:
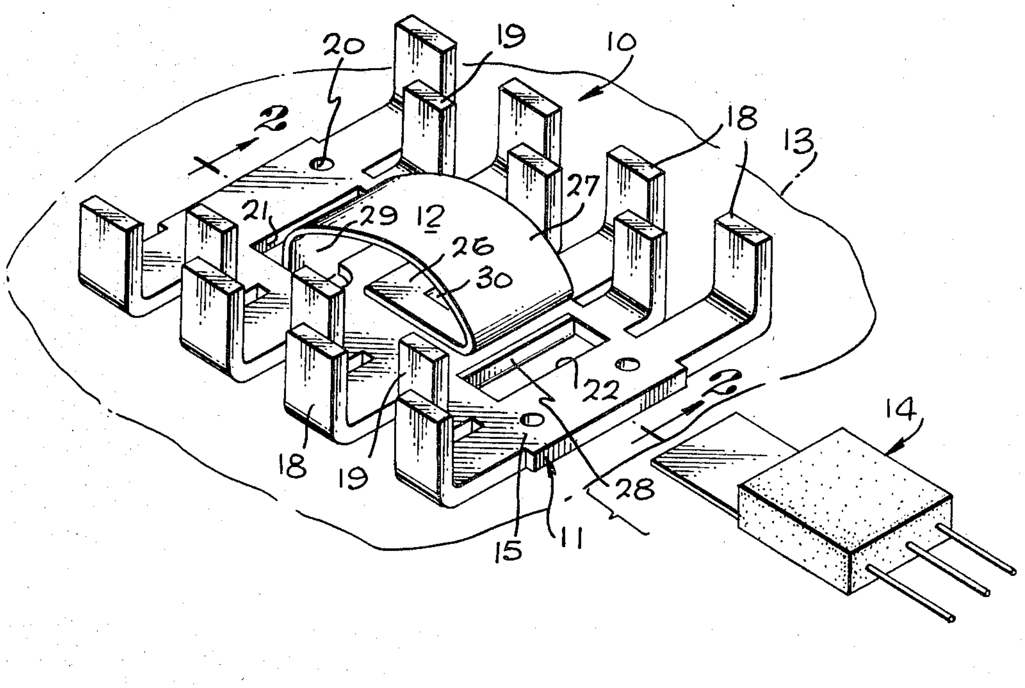
FIG. 1 is a top perspective view of one form of the device showing an electronic component in the act of being inserted therein.

In one embodiment of the invention chosen for the purpose of illustration there is shown a clip assembly 10 comprising essentially a heat dissipating member 11 and a resilient clip 12 which in assembled relationship are adapted to be mounted upon a chassis or heat sink 13 and provide for reception of an electron component 14.

Figure 2:
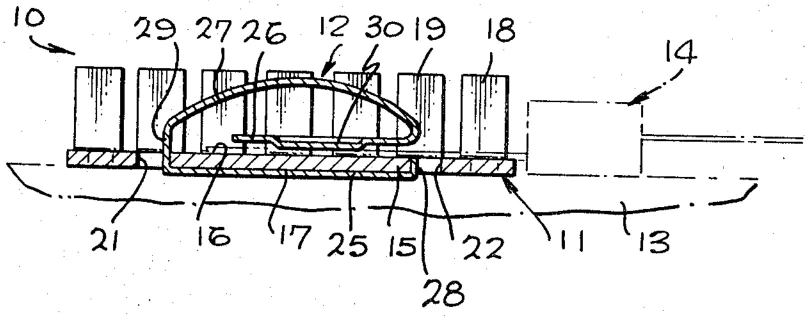
FIG. 2 is a longitudinal sectional view taken on the line 2–2 of FIG. 1.

More particularly, the heat dissipating member 11 consists of a relatively flat base 15 having on an upper face thereof as viewed in FIGS. 1 and 2 a retaining area 16 for the component 14 and on an opposite face a mounting area 17 which faces downwardly. Substantial portions of the mounting area 17 are designed to engage against the chassis or heat sink 13. Along each opposite side of the base 15 are two rows of fingers 18 and 19, respectively, which are spaced from each other, the fingers of the different rows being staggered one with respect to another. The fingers are located and spaced in such fashion as to allow a relatively substantial space between them which is occupied by the retaining area 16. Holes 20 are provided by means of which the base may be attached to the chassis by appropriate conventional means.

There are additionally provided in the base 15 two longitudinally spaced transverse slots 21 and 22 which extend entirely through the base from one side to the other.

Figure 3:
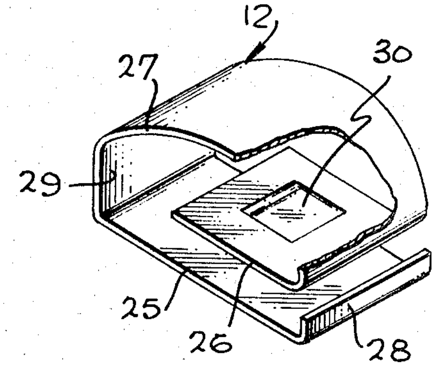
FIG. 3 is a top perspective view of a spring clip forming part of the device.

The resilient clip 12 consists of an inherently resilient spring material which may, for example, be beryllium copper because of its dependable consistency and its ability to conduct heat. As shown in FIGS. 1, 2, and 3 the resilient clip consists of three folded sections, namely, a section 25 comprising a retaining end which engages the base 15, a section 26 forming a component engaging end and an intermediate section 27 which interconnects the sections 25 and 26. On the endmost edge of the retaining end is a flange 28 which is turned upwardly so as to engage in the transverse slot 22, when the section is in a position underlying the mounting area 17 of the base 15. In this position a wall section 29 extends from the section 25 upwardly through the transverse slot 21 to a location where it engages the remainder of the section 27. By having the distance between the wall section 29 and the flange 28 approximately equal to adjacent walls of the transverse slots 21 and 22 a snug fastening engagement can be experienced when the clip is in place due to the inherent resiliency of the clip material. On the section 26 there is provided a downwardly extending projection 30, made by merely punching a portion of the section 26. The intermediate section 27 arcs over the section 26 and its projection 30 substantially as shown in the drawings.

When the component 14 is to be attached it is merely slid into engagement with the clip assembly so that a tongue 31 of the component, which is usually of heat conductive material, is forced into position between the projection 30 and the retaining area 16 so that the tongue is pressed against the base 15 as a result of pressure applied by the projection 30 directly to the tongue. These pressures also act opposite to the application of pressure by the retaining end section 25 upwardly against the mounting area 17. In this way by virtue of the compressive character of the clip acting with respect to all of its parts the clip is pressed into engagement with the heat dissipating member and the component is simultaneously pressed into engagement with the heat dissipating member and the clip itself. Since all of the parts are heat conducting material a very dependable path of heat transfer by conduction is created from the component to the chassis.

Figure 4:
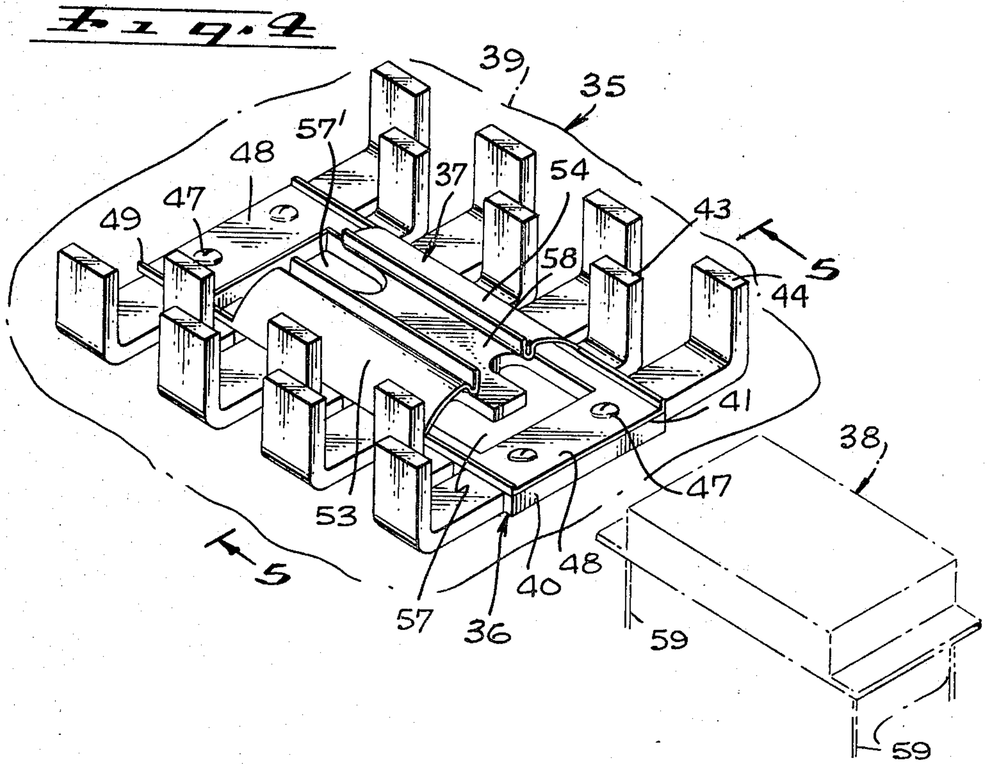
FIG. 4 is a top perspective view of a second form of the device.
Figure 5:
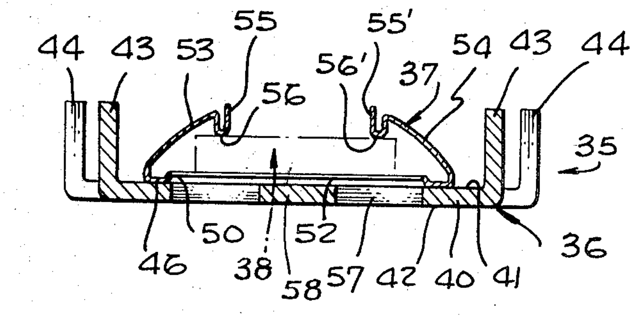
FIG. 5 is a cross-sectional view on the line 5–5 of FIG. 4.
Figure 6:
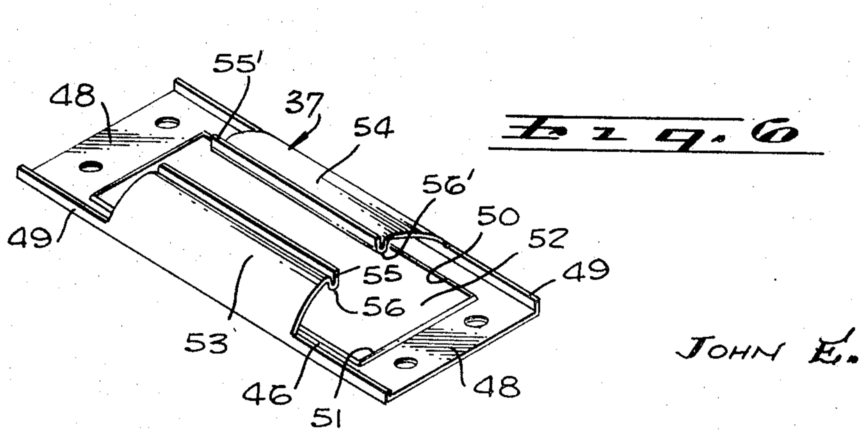
FIG. 6 is a top perspective view of a spring clip forming part of the device of FIG. 4.

In the form of invention of FIGS. 4, 5 and 6 there is shown a clip assembly 35 consisting primarily of heat dissipating member 36 and a resilient clip 37. These parts being assembled for reception of an electronic component 38 for mounting it upon an appropriate heat sink or chassis 39. The heat dissipating member 36 is similar in general to the heat dissipating member 11 in that it comprises a base 40 providing a retaining area 41, a mounting area 42 and rows of fingers 43 and 44 surrounding the retaining area. The fingers 43 form inner rows and are spaced from each other to assist in the circulation of air in between them. The outer fingers 44 are likewise spaced from each other and placed in staggered relationship with respect to the fingers 43.

The resilient clip 37 comprises essentially a plate 46 which, in the embodiment shown, is relatively flat and is adapted to be applied to the retaining area 41 to which it is shown as being attached by means of screws 47 applied to end element 48. Lateral flanges 49 provide rigidity. Inner flanges 50 and 51 define an open space 52 which comprises a substantial portion of the plate 46.

Extending over the open space 52 are oppositely disposed laterally spaced wings 53 and 54 having outside edges secured and forming part of the respective lateral flange 49. At the inner or free end of the wing 53, for example, there is provided a folded portion 55 forming a downwardly directed curved bead 56. On the wing 54 is a similar folded portion 55' and bead 56'. In each instance the folded portions 55, 55' and beads 56, 56' overlie the open space 52. Additional open spaces 57, 57' are provided in the base 40 at opposite ends of a central section 58. The spaces 57, 57' extend throughout the width of the open space 52.

When the clip assembly 35 has been mounted upon the heat sink 39 in the manner described the component 38 is inserted endwise beneath the beads 56, 56' which are pressed in engagement with the upper surface of the component, due to the inherent resiliency in the wings 53, 54. Pressure exerted as described presses the bottom surface of the component into engagement with the retaining area 41 and in particular the upper face of the central section 58 causing a firm face to face engagement of the parts described. Inasmuch as the mounting face 42 is held firmly in engagement with the upper surface of the heat sink 39 by application of the screws 47, the path of conduction of heat from the lower portion of the component 38 is directed through the heat dissipating member 36 and from those portions of the plate 46 to the heat dissipating member along the side edges where such engagement takes place.

By reason of the cliplike arrangement and the open ends provided as shown the component 38 can be readily applied to the assembly where it is firmly held in position. Once in position the leads 59 of the component are extended through respective spaces 57, 57' and in a conventional manner through the chassis. When the component is to be removed, the leads need only be disconnected where after the component can be slid endwise free of engagement with the beads 56, 56' leaving the clip assembly available for application of a replacement component.

By the construction shown and described integrated circuit packages which heretofore have been capable only of operating at substantially less than their capacity rating can operate at a higher rating when cooled by having heat conducted away from them through the assembly with considerable effectiveness. A multiple cooling effect is achieved by mounting the integrated package in such fashion that additional cooling can be accomplished by convection, namely circulation of air outwardly around the open spaces inherently provided by the resilient clip, as well as through the spaces provided by the fingers of the heat dissipating member. Location and spacing of the fingers assists in the creation of a degree of turbulence around the midportion occupied by the clip and the component.

While the invention has herein been shown and described in what is conceived to be the most practical and preferred embodiment, it is recognized that departures may be made therefrom within the scope of the invention, which is to be accorded the full scope of the claims so as to embrace any and all equivalent devices.

I claim:

1. A clip assembly for releasably holding on a supporting structure an electric component possessing electric leads at edges thereof comprising an inherently resilient spring element of relatively flat spring material, a first portion of said spring element being for attachment to said structure, a second portion of said spring element having an operative position in overlying retaining engagement with said component and in overlying relationship with said structure, and a third portion of said spring element interconnecting said first and second portions, said spring element having an opening extending through said first portion substantially coextensive with said electric component, a heat dissipating base member for mounting in heat conducting engagement with said supporting structure, said heat dissipating base member comprising one portion having opposite ends in underlying engagement with the first portion of said clip assembly and another portion intermediate said opposite ends for underlying engagement with the component, and means securing said spring element and said heat dissipating base member in heat conducting engagement, said other portion of the heat dissipating base member having a breadth adapted to lie intermediate opposite leads of said component.

2. A clip assembly for conducting heat from an electronic component as claimed in claim 1 wherein the midportion of the heat dissipating member is a relatively flat plate with a retaining area on one face thereof and a mounting area on an opposite face.

3. A clip assembly for conducting heat from an electronic component as claimed in claim 2 wherein pressure applied by the spring element to the component is in a direction toward the location of said retaining area.

4. A clip assembly for conducting heat from an electronic component as claimed in claim 1 wherein there is an access opening for said spring element facing laterally relative to said retaining area whereby said component is slid in a direction parallel to said retaining area when moved into engagement with said clip.

5. A clip assembly for conducting heat from an electronic component as claimed in claim 1 wherein said spring element comprises laterally spaced wings with side edges secured to a part of said spring element adjacent the mounting area and free edges being spaced therefrom at a location overlying respective sides of said component.

6. A clip assembly for conducting heat from an electronic component as claimed in claim 5 wherein there is a folded portion on each free edge of the spring element forming a folded engaging end for contact with said component.